Patented Dec. 1, 1942

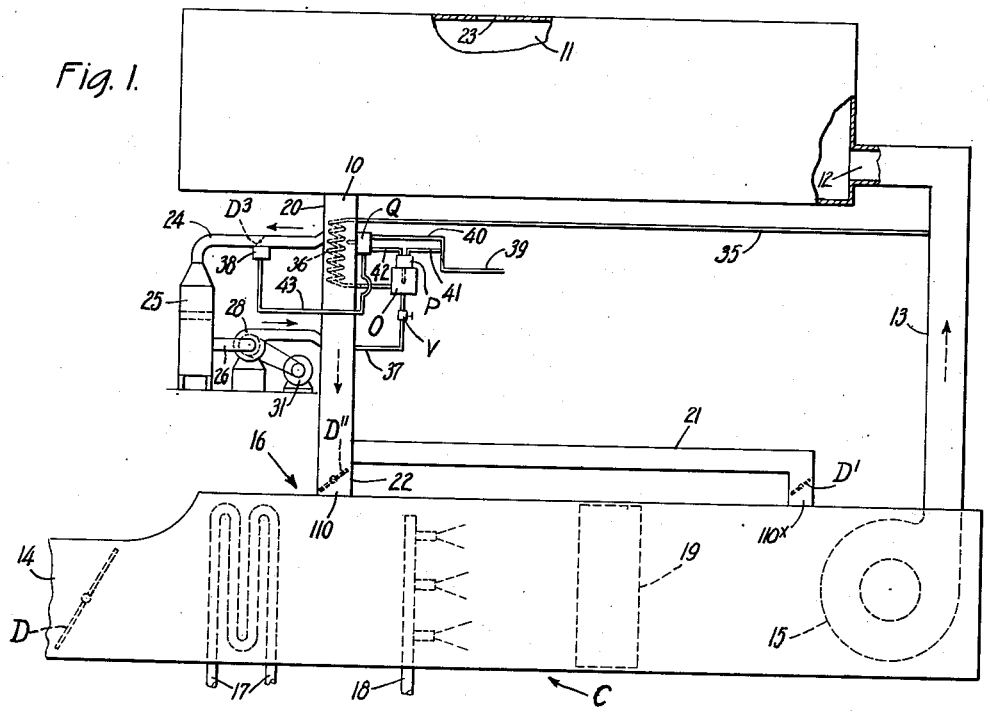

2,303,331

UNITED STATES PATENT OFFICE 2,303,331

AIR PURIFICATION

George S. Dauphinee, Brooklyn, N. Y., assignor, by mesne assignments, to W. B. Connor Engineering Corp., New York, N. Y., a corporation of New York Application September 4, 1936, Serial No. 99,440

2 Claims. (Cl. 183—4)

This invention relates to air-conditioning, especially to the removal of extraneous gases and other adulterants from air in compartments or enclosures occupied by human beings, and, more particularly to the reduction in quantity of inclusions such as body emanations which give rise to conditions of discomfort, and may prevail to an unsanitary degree.

The practice of re-circulating air in the heating or cooling of buildings—not only manufacturing buildings, but public buildings and even homes—is becoming very common. Substantial savings in cost of equipment, operation and maintenance can be effected by such procedure. This is most important, especially in the case of air conditioning which involves air cooling.

In accordance with the earlier practices of ventilation, all air circulated was drawn from the outside, and the standard requirements in respect to volume were based on the allowance of a relatively slight rise in carbon dioxide content of the room air over that in outside air. To meet this requirement it was considered necessary from a health standpoint to supply for average conditions, 30 cubic feet of fresh air per minute per occupant. Later investigations indicate that carbon dioxide concentration three or four times that on which the former requirements were based, is harmless. Accordingly, at present it is customary to operate such a system using as little as six cubic feet of fresh air per minute, and re-circulating five or six times this amount of air confined within the system. Especially where air cooling is involved, it is obvious that for all around economical performance this reduction in the fresh air supply is very desirable. Unfortunately, in the majority of cases there are other factors which preclude this procedure to a great extent. The rooms become stuffy; body and other odors are manifest to an objectionable degree; and in general, a condition of discomfort, and often an unsanitary condition, prevails. Many and varied means have been proposed to counteract this condition in lieu of increased fresh air supply, but so far none of these fully developed have solved this problem with all around satisfaction.

An apparatus using activated carbon has been proposed, and even demonstrated successfully as to its ability to cleanse such air of its odorous impurities, and yet its utilization in the treatment of recirculated air has not reached the point of commercial practicability, due to high cost of equipment, operation, maintenance and other causes. My patent application No. 99,233 filed September 3, 1936, now Patent #2,214,737, describes a device, or combination of devices, that is a decided improvement from the above standpoint, and which I believe will make practical such utilization.

The existing proposals are based on passing all the re-circulated air through the adsorber. This I conceive to be unnecessary, and if adhered to, a great detriment to progress in the development of this branch of the art. I have conceived the idea of fractional treatment of this return air and regulating the quantity so treated in conformity with the rate of odor generation within the enclosure or system.

The odors manifest in air conditioning systems are from two sources—one of rather a constant generating rate in systems which have been in operation for some time, and the other of a variable rate of generation dependent on the number of occupants in the conditioned enclosure. The first has its origin in the accumulation of dust within the duct system, a slight algal growth on the moist surfaces at the rear of the free moisture eliminator baffles of the conditioner, or moistened surfaces adjacent thereto; from wash water that is allowed to become stale, and again from the accumulated dust and fermenting waste animal matter on the air filter. In many cases these air filters are of the viscous or oil type which give off oil vapors to the air stream even when the most stable oil is used. The other source is body odor from the occupants, and in the majority of cases the latter source contributes the major problem, and odor generated from this source is on the average proportioned to the number of occupants.

The volume of air circulation through an enclosure for air conditioning is based on that found necessary to maintain comfort conditions in respect to temperature, humidity and air movement, and incidentally the amount recirculated is a direct function of this total quantity. For the control of body odors and the like, however, the amount of air to be treated should be based on the rate of odor generation within the enclosure, and, for the most ecnomical performance, the amount of air so treated should be proportioned so that equilibrium is established and maintained between odor generation and removal at a point where satisfactory condition from the odor standpoint is produced. Recent engineering research has fairly well established the amount of fresh air per person that must be admitted to an occupied enclosure so that such satisfactory conditions from the odor standpoint are maintained, and this amount is only a fraction of the amount of air ordinarily recirculated in air conditioning systems. Air after passing through a layer of carbon of sufficient thickness is practically 100% pure in respect to odorous gases; accordingly, such air from this standpoint is the equivalent of fresh outside air. Hence, the amount of recirculated air to be treated for odors, plus the necessary amount of outside air for oxygen-supply is approximately 14 cubic feet per minute per person, under average conditions where the net air space per person is 250 cubic feet. If we consider 6 cu. feet per person per minute as the minimum outside-air supply, then 8 cu. feet per person of the recirculated air should be passed through the odor adsorber. This is probably 20 to 30% of that ordinarily re-circulated.

A simple arrangement would be to place the adsorber beds into the recirculating duct, passing the required amount of air through them and by-passing the remainder. The operating cost with this arrangement would be high, the entire amount of air circulated being subject to the air resistance of the adsorber, and would be even worse from this standpoint if the arrangement were such that the amount treated was by-passed around the main fan, when the extra volume passing through the fan would be subject to the entire resistance of all equipment on suction side of the fan.

Under such conditions, an object of the present invention is to provide a novel method for such fractional treatment of the air under re-circulation in an air-conditioning system that the quantity so treated shall be in substantial conformity with the rate of odor generation within the enclosure or system, and whereby the treatment shall be calculated to effect a perceptible and satisfactory improvement in the comfort and sanitary conditions within the enclosure.

A cognate object is to provide means for carrying into effect the above method in such a manner that the power expenditure required is confined to the actual air treated; and in pursuance of this object to provide a duct with a damper or dampers regulated by means adapted to respond to the varying moisture gain of the air passing through the enclosure, due to variation in the number of occupants, as the odor given off by the occupants will parallel substantially the moisture which they also give off.

Other objects and features of the invention will be made to appear as the description of the particular physical embodiment selected to illustrate the invention progresses.

In the accompanying drawing, the single figure shows in a schematic view in sectional elevation, an air-conditioning system adapted to carry into effect the novel method of the present invention.

In a now preferred embodiment of the invention, the reference character 11 designates a compartment enclosure or space for occupancy, such as the auditorium of a theater, to be served with conditioned air, and having an inlet 12 from a duct 13 leading to a conditioner designated generally by the reference character C, which may be in general of substantially conventional, or otherwise suitable, structure and organization, being shown as having an opening 14 to a source of fresh air and an impeller 15 energized by a suitable electric motor (not shown) by which the air may be circulated.

The conditioner proper, as at 16, includes also a heater 17, a scouring device, purifier or spray 18, and a moisture eliminator 19, and the system is provided with a return duct 20 leading from an orifice 10 in the chamber 11 to an orifice 110 in the conditioner C, said return duct having a branch 21 interconnecting the duct 20 with orifice 110 of the conditioner chamber M. By the above system, air may be intercirculated between the enclosure 11 and conditioner C, and as much fresh air drawn in as desired, the contained air being re-circulated in known manner, or in any suitable manner.

In the instance illustrated, the invention is shown as adapted to be carried into practice in connection with a system operated as a plenum system, although the utilization of the invention is not limited to such employment. Viewed as a plenum system, the orifice 23 is merely illustrative of the various places, such as window and door crevices, etc., at which a certain amount of the contained air of the enclosure may escape therefrom, being conventionally replaced by an equivalent amount of fresh air drawn in through inlet 14 by the suction created by impeller 15, and forced through duct 13 and opening 12 into the enclosure. A main damper D controls the volume of air thus admitted to the system, this damper being adapted to be controlled manually, or automatically by means, not shown, which may be of conventional or otherwise suitable, construction.

In the branch 21, and in the lower part 22 of duct 20, like dampers D' and D'' may similarly be controlled manually or by suitable automatic devices (not shown) for regulating the amount of contained air intercirculated between the enclosure 11 and the container C.

In pursuance of the general object of the invention, means are provided to effect a fractional by-circulation of part of the air-stream in course of inter-circulation through the closed circuit comprising the enclosure element 11, conditioner element C and the ducts 13, 20, 21 and 22 just described.

As a now preferred means for accomplishing such fractional by-circulation, the invention provides a duct subsidiary circuit comprising a branch duct 24 leading to a deodorizer element 25, from which another duct component 26 leads back to the duct 20, a blower 28 being preferably included in this by-circuit to maintain circulation in the direction of the arrows. Means are preferably provided, as at D3, to permit manual and/or automatic control of the flow of air through the by-circuit.

As hereinbefore mentioned briefly, the flow is desirably modulated by suitable means adapted to respond to the varying moisture gain of the air passing through enclosure 11, due to variations in the number of occupants, as the odor given off by the occupants will parallel substantially the moisture which they also give off. The relative humidity increase, as indicated from equal temperature samples of the air entering and leaving the enclosure, is a very accurate indicator of the number of occupants, since under ordinary conditions the occupants are the only source of moisture gain.

As a suitable form of automatic moisture influenced control for this purpose, a small tube 35 of about ¼" in diameter is connected to duct No. 13 in which the air pressure is relatively high and the tube 35 runs to a coil 36 placed within the return air duct 20. The purpose of this coil is to cause an interchange of heat between the relatively cool air in the tube and the relatively warm air in the duct surrounding the coil, so that the temperature of the air within the coil is brought substantially to the temperature of the air surrounding it. This air, after passing through the coil, flows through the small chamber O and thence into the relatively low pressure air duct 20, as at 37. Now there exists in the chamber O air at substantially the same temperature as the return air from the enclosure, but with the relative humidity during periods of occupancy of enclosure 11 lower than that of the return air in duct 20, which has picked up the moisture given off by the occupants. While occupancy exists, there will always be a differential relative humidity existing between the air in chamber O and that of the duct 20. Humidostats P and Q placed in chamber O and duct 20 respectively will react to the relative humidity of both points and thereby actuate the damper D3 in correspondence with the difference in relative humidity at these points, or in other words, in response to the moisture gain of the air while passing through enclosure 11. The actuation of damper D3 is effected by known fluid pressure actuated devices in box 38, and which need not be shown in detail, the supply of fluid under pressure for this purpose being derived through a tube 39 from a suitable source thereof (not shown). Suitable conduits 40, 41, 42 and 43 interconnect the supply tube 39, with the humidostats P and Q, and the damper regulator 38.

A possible modification of this may include the form of control use of a variable speed motor as 31, to drive fan 28 and to make the speed of this motor respond to the humidity differential explained above by a similar use of humidostats P and Q.

The means herein shown are illustrative and do not exhaust the possible physical embodiments of the idea of means underlying the present invention. They are not intended to exclude use of any suitable device for making the air volume directly responsive to odor concentration or intensity.

It will be noted that this apparatus can be readily installed as an addition to an existing air-conditioning system with the least possible amount of change in the said system, and that it does not obstruct the regular air flow, or throw the present air circulating system out of balance, necessitating changes in the existing blower or imposing a load beyond its capacity. Furthermore, the apparatus can be designed to handle all the air carried by duct 20 or any desired fraction thereof to satisfy the requirements hereinbefore mentioned.

At 34 in the deodorizer element is indicated the use of an adsorber unit. Such a unit may desirably take the form disclosed in my Patent #2,214,737 employing an activated carbon, but other forms of deodorizer may be used.

In this connection, it is of importance to understand that adsorber beds fail from two causes—either saturation by absorbed gases or by becoming excessively resistant to air flow due to the accumulation of dust and dirt, as such absorber beds are very efficient dust arrestors. Even when the air to the adsorber is passed through the regular efficient commercial air filter, dust accumulated within the carbon bed is manifested by a slight but gradual increase in resistance to air flow. As applied to air-conditioning service, the life of the adsorber bed of practical thickness made of high grade activated carbon would be three years or more from the standpoint of odor adsorbtion.

From the above it is obvious that dust accumulation, even with the use of efficient air filters, is the governing factor determining the practical life of the adsorber bed, or in other terms, the amount of air passed through the bed is the determining factor from this standpoint. Accordingly, economical operation dictates the control of air flow restricted in quantity to the specific requirements in accordance with varying odor generation, or in other terms, proportioned to the number of occupants in the enclosure.

The details of controlling devices for such a motor need not be described, as the same may follow known practice in motor regulation.

I have described what I believe to be the best embodiments of my invention. I do not wish, however, to be confined to the emebodiments shown, but what I desire to cover by Letters Patent is set forth in the appended claims.

I claim:

1. The method of odor control in air circulating circuits of air conditioning or like systems in which conditioned air is delivered to an enclosure forming a part of the circuit, which comprises diverting a moiety of the air from the main circuit, causing such moiety to flow through permeable beds of material having the property of adsorbing odorous gases, varying the said moiety fractionally in accordance with the difference between the relative humidity of the air entering said enclosure and the relative humidity at the same temperature of the air leaving said enclosure, and returning the thus deodorized air to the circuit, the moiety thus diverted, deodorized and returned being sufficient to reduce the odorous content of the air delivered to the enclosure to a tolerable small degree of concentration.

2. An air conditioning system of the class described and comprising an enclosure, an air conditioner, and a duct provided with an impeller to intercirculate air between said enclosure and conditioner, said system being characterized by a by-pass associated with said duct, said by-pass having mounted therein means to withdraw a moiety of the circulating air, beds of material having an adsorptive affinity for odorous gases disposed in said by-pass and serving to remove from such moiety the odorous contents thereof, a pair of humidity responsive devices, one exposed to air leaving the enclosure and the other to air returning to the enclosure, means whereby the temperatures of the air affecting the two devices are equalized, and control means operable by said devices in response to the difference between the relative humidities of the inlet and outlet air to vary the volume of the moiety.

GEORGE S. DAUPHINEE.